UNITED STATES PATENT OFFICE.

CHARLES E. VANDERKLEED, OF COLLINGSWOOD, NEW JERSEY, ASSIGNOR TO HERCULES POWDER COMPANY, OF WILMINGTON, DELAWARE, A CORPORATION OF DELAWARE.

PROCESS OF MAKING MANGANATES.

1,339,242.  Specification of Letters Patent.  Patented May 4, 1920.

No Drawing.  Application filed November 21, 1918.  Serial No. 263,491.

*To all whom it may concern:*

Be it known that I, CHARLES E. VANDERKLEED, a citizen of the United States, residing in Collingswood, New Jersey, have invented Processes of Making Manganates, of which the following is a specification.

In the past, sodium or potassium manganate has been made by heating, fusing or furnacing together manganese dioxid with caustic soda or caustic potash, as the case might be, and in order to hasten the production of the manganate it was customary to add an oxidizing agent such for example as sodium or potassium nitrate or sodium or potassium chlorate. I have discovered that in order to still further hasten the process and at the same time increase the yield of the manganate, sodium peroxid may be advantageously used.

One object of my invention therefore, is to provide a process for the manufacture of sodium manganate which in addition to being easy to carry out and economical in operation, shall be of such a nature as to require simple and inexpensive apparatus;— the invention being particularly designed to provide a relatively cheap process for use in connection with the manufacture of the various permanganates.

In carrying out my process I use in a typical case, ten parts each of sodium hydroxid and finely divided manganese dioxid, the latter being in the form of a powder capable of completely passing through a screen of one hundred and fifty meshes to the inch. This mixture is fused at a relatively low temperature, (*i. e.*, sufficient to fuse the sodium hydroxid) in a cast iron kettle or pan, being stirred during the addition of the manganese dioxid to the sodium hydroxid. As a result of this operation some sodium manganate is formed, but not in economical proportions. I therefore remove the fused or plastic mass from the kettle and after it has cooled, pulverize it in a suitable mill and intimately mix it with four parts of sodium peroxid. It is then returned to the kettle and is constantly stirred until it has been raised to a dull red heat. Partial fusing thereupon results and the heating with the stirring is continued until the mass has acquired a uniformly green color. If desired a current of hot air may be blown over the heated mixture during this latter part of the operation. The mass is then removed from the kettle, cooled and ground in a suitable mill to a uniformly fine powder, the product containing a high percentage of sodium manganate suitable for oxidation by the usual means to form sodium permanganate. It is to be understood that my process is not to be considered as limited to the exact proportions or procedure above specified.

In carrying out the first part of my process the reaction occurring is as follows:

$$2MnO_2 + 4NaOH + 2O = 2Na_2MnO_4 + 2H_2O$$

As a result of the addition of the sodium peroxid the following reaction occurs:

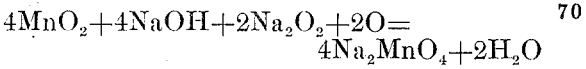
$$4MnO_2 + 4NaOH + 2Na_2O_2 + 2O = 4Na_2MnO_4 + 2H_2O$$

The sodium manganate formed as above described is an intermediate product in the manufacture of sodium permanganate, for example, which in a typical case, may be made by dissolving the sodium manganate in water at a temperature of about 80° C. and thereafter passing chlorin gas through the solution. The following reaction thereupon takes place:

$$2Na_2MnO_4 + 2Cl = 2NaCl + 2NaMnO_4$$

The sodium chlorid formed may be separated from the solution of sodium permanganate by crystallization. While for economic reasons I employ sodium hydrate and sodium peroxid in carrying out my invention, it is to be understood that it may be carried out by fusing sodium peroxid alone with manganese dioxid, with the formation of sodium manganate in a single step operation in accordance with the following reaction:

$$MnO_2 + Na_2O_2 = Na_2MnO_4.$$

I claim:

1. The method which consists in causing manganese dioxid and sodium peroxid to react by fusing them together to form sodium manganate.

2. The method which consists in causing manganese dioxid and sodium hydrate to react, and thereafter treating the product of said reaction with sodium peroxid to form sodium manganate.

3. The process which consists in fusing together manganese dioxid and sodium hydroxid; and thereafter fusing the product of said operation with sodium peroxid to form sodium manganate.

4. The method which consists in fusing together manganese dioxid and sodium hydrate; cooling and pulverizing the resulting product; and thereafter fusing said product with sodium peroxid to form sodium manganate.

5. The method which consists in fusing together ten parts of manganese dioxid and ten parts of sodium hydrate; and thereafter fusing the product of such operation with four parts of sodium peroxid to form sodium manganate.

In witness whereof I affix my signature.

CHARLES E. VANDERKLEED.